No. 625,611.  
W. J. SMITH.  
TAP.  
(Application filed Feb. 4, 1899.)  
(No Model.)  
Patented May 23, 1899.  
2 Sheets—Sheet 2.

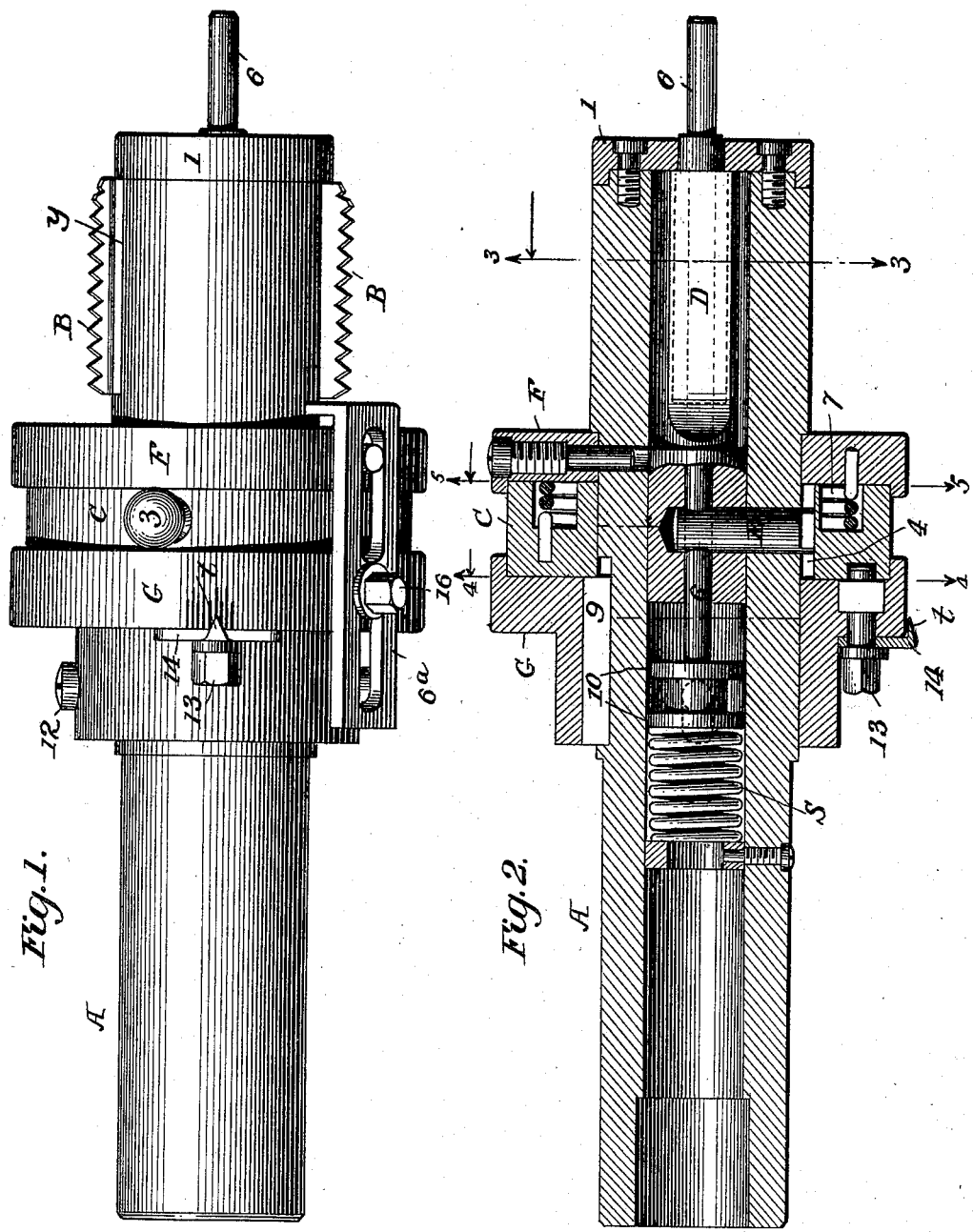

Witnesses  
J. G. Hinkel  
Harry E. Hay.

Inventor  
William John Smith  
by Foster Freeman  
Attorneys

THE NORRIS PETERS CO., PHOTO-LITHO., WASHINGTON, D. C.

UNITED STATES PATENT OFFICE.

WILLIAM JOHN SMITH, OF NEW HAVEN, CONNECTICUT, ASSIGNOR TO THE GEOMETRIC DRILL COMPANY, OF WESTVILLE, CONNECTICUT.

TAP.

SPECIFICATION forming part of Letters Patent No. 625,611, dated May 23, 1899.

Application filed February 4, 1899. Serial No. 704,542. (No model.)

*To all whom it may concern:*

Be it known that I, WILLIAM JOHN SMITH, a citizen of the United States, residing at New Haven, in the county of New Haven and State of Connecticut, have invented certain new and useful Improvements in Taps, of which the following is a specification.

My invention relates to taps; and it consists of a tap provided with a plurality of cutters so supported upon the stock as to be radially movable, whereby they may be carried inward from their cutting position after their operation has been effected upon any article, as fully set forth hereinafter and as illustrated in the accompanying drawings, in which—

Figure 3:
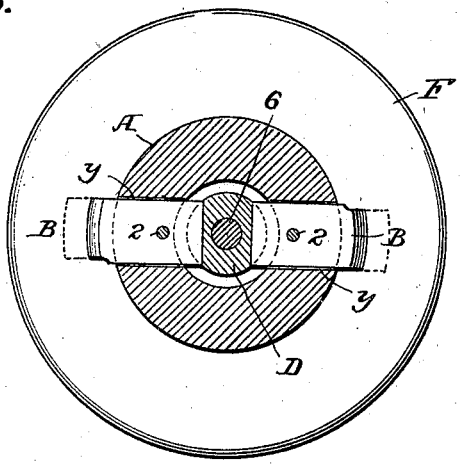
Figure 4:
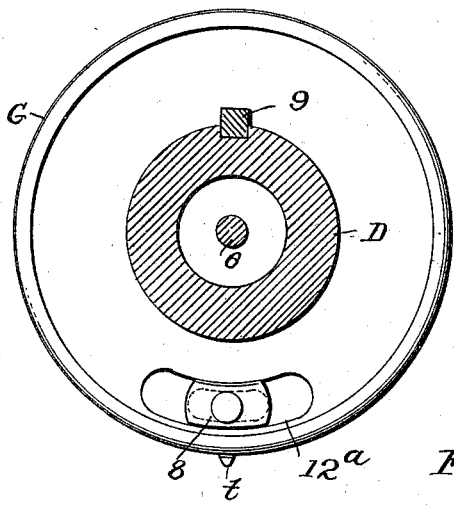
Figure 5:
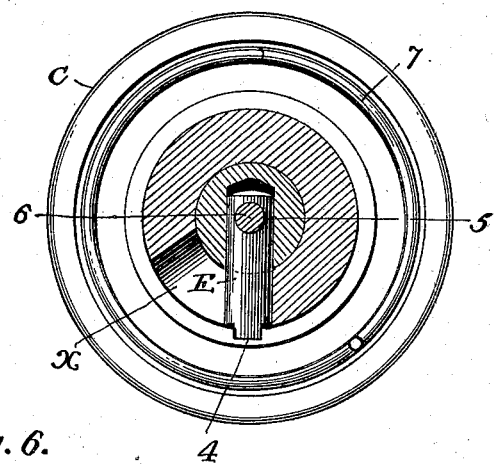
Figure 6:
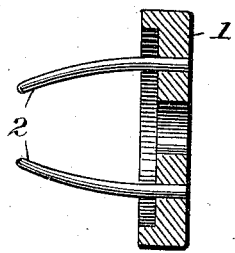

Figure 1 is a side view of a tap embodying my improvement; Fig. 2, a longitudinal section; Fig. 3, a section on the line 3 3, Fig. 2; Fig. 4, a section on the line 4 4, Fig. 2; Fig. 5, a section on the line 5 5, Fig. 2; Fig. 6, a detached sectional view showing the support for the springs of the cutters.

The stock A of the tap is of any suitable form and proportions and adapted to be fitted in the revolving holder of a turret or to be secured in a stationary support in the tail-stock of a lathe or otherwise and at the forward end has radial slots $y$ to receive the radial cutters B, which may be two, three, four, or more in number, as desired. Within the stock, which is bored out or hollow for this purpose, is a cam-bar D, having a series of flat faces corresponding to the number of cutters, the inner ends of which bear on the said flat faces when they are in their retracted position, so that on rotating the cam-bar to a greater or less extent the cutters may be thrown outward to a greater or less extent, and then by rocking the cam-bar in the reverse direction the cutters can move inward. The inward motion of the cutters may result from the weight thereof; but preferably springs are employed to carry them inward when the bar is rocked to the position shown in Fig. 3. These springs may be arranged in any suitable position; but as shown the stock is provided with a terminal cap-piece 1, from which springs 2 2 project inward, one extending into an opening in each one of the cutters and pressing it inward, so as to cause its inner end to bear against the surface of the cam-bar. It will be seen that when the cutters are moved outward by the cam-bar they will be under tension, caused by the springs forcing them against the cam-bar.

In order to rock the cam-bar from outside the stock, I provide any suitable operating means extending from the cam-bar through the stock. A handle or lever might be employed for this purpose; but preferably I make use of a rotating collar C, turning on the stock and provided with a handle 3, by means of which it may be turned, the said collar being connected suitably with the cam-bar. One means of connection consists of a key E, extending through a slot $x$ in the stock and into a key-slot 4 in the collar and passing through a transverse opening of the cam-bar and provided with a transverse hole 5, through which extends a pin 6, hereinafter termed a "contact-pin," the said pin extending through a longitudinal opening in the cam-bar and projecting beyond the same to any desired extent.

By providing a cam-bar and radial movable cutters as described the cutters may be thrown out by rocking the cam-bar to the proper position for cutting the threads in any desired opening, and then by rocking the cam-bar back to its first position the cutters are permitted to move inward, so that the tap may at once be withdrawn from the threaded opening.

Preferably automatic means are employed for rocking the cam-bar to permit the cutters to be carried inward as soon as the cutting of the opening is completed. Thus a spring is suitably arranged, so as to turn the cam-bar, and the contact-piece 6 or a contact-piece of any other suitable form and arrangement is employed for putting such spring in action to turn the cam-bar. The said spring might be wrapped around the cam-bar or operate upon some part connected therewith. As shown, the spring 7 is arranged within a recess of the collar C, one end of the spring connected to the said collar and the other end of the spring connected to a face-plate F, stationary on the stock, the said spring arranged to normally act to turn the collar, and with it the cam-bar, to the position shown in Fig. 3.

It is of course necessary to lock the cutters prior to beginning operations in their outward position, and I therefore provide means whereby the cam-bar after it has been turned to project the cutters outward is secured from turning, employing any suitable locking device, and this locking device I operate by means of the contact-piece or its equivalent by contact with the material being operated upon or with its support as soon as the threading operations are completed. One form of locking device consists of a projection or pin 8, carried by a locking-disk G, sliding upon the stock, but turning therewith, the pin or its locking-plate being connected with the contact-piece, so as to move backward therewith, and thus withdraw the locking-pin from a shoulder or opening in the collar C. As shown, the locking-disk G is prevented from turning by a feather 9, carried by the stock, and a spring is arranged to carry the locking-disk forward. One arrangement to this end consists in applying a spring S to bear upon the end of the rod 6 extending through the cam-bar D and providing the rod with two collars 10 10, receiving between them a pin 12, extending through a longitudinal slot in the stock and into the hub of the disk G.

When the tool is to be used, the collar C is turned, rocking the cam-bar and throwing outward the cutters until the opening in the collar is opposite the pin 8, when the latter, with the supporting locking-disk, will move forward, projecting the pin into the opening and locking the parts in place. When the cutters have entered the socket or opening to be threaded to the proper depth, the contact of some part of the article operated upon or of the support therefor with the end of the contact-piece 6 will force back the latter, carrying back the disk and the pin 8, removing the latter from the opening in the collar C, when the spring 7 will turn the said collar, and with it the cam-bar D, so as to permit the cutters to move inward, when the tool can at once be withdrawn from the threaded opening.

It is not essential that the cam-bar shall be turned to its full extent. According to the desired depth of the cut it may be turned to a greater or less extent and secured in any desired position. To permit the extent of movement to be varied and to lock it in any position to which it is set, the relative circumferential positions of the pin 8 and the opening into which it extends can be changed. For instance, the said pin may extend into a curved slot $12^a$ in the disk G, so that by setting the pin to a greater or less extent to one side of the center of said slot the collar C may be locked after a greater or less degree of rotation. As shown, the pin 8 is provided with a head and with a threaded stem on which is a nut 13, bearing upon a plate 14, provided with an index-finger $t$, extending over graduations on the periphery of the disk G, so that the extent to which the pin is set to one side or the other of the center of the opening $12^a$ may be indicated and determined. The cutters may therefore be moved outward to any one of different desired positions and be positively locked in such position.

The contact-piece may be differently arranged from the arrangement described or two contact-pieces may be employed. For instance, a contact-piece $6^a$ may consist of an adjustable bar slotted to receive a bolt 16, extending through the slot into the periphery of the disk G, as shown in Fig. 1. The contact of the article operated upon with the end of this contact-piece $6^a$ will serve to push back the disk G and unlock the cam-bar. It will be evident, however, that any other suitable connection may be made between the locking-pin or its equivalent and the contact-piece to effect the result required.

Without limiting myself to the precise construction and arrangement of parts shown and described, I claim as my invention—

1. A tap provided with a stock supporting a series of radially-movable cutters having cutting edges at the outer ends, means for supporting and positively locking the cutters under tension in any one of a series of desired outer positions and for releasing the same to permit them to move inward, substantially as set forth.

2. A tap provided with a stock supporting a series of radially-movable cutters having cutting edges at the outer ends, positive means for supporting and locking the cutters under tension in any one of a series of desired outer positions, and means for mechanically releasing the same to permit them to move inward, substantially as set forth.

3. A tap provided with radially-movable cutters and a cam-bar against which the inner ends of the cutters rest, means exerting a yielding pressure against the outward movement of the cutters, means to turn the cam-bar to carry the cutters outward and support them under tension, and means to positively lock the bar against movement in either direction and in any one of a series of desired positions to which it may be turned, substantially as set forth.

4. A tap provided with radially-movable cutters and a cam-bar against which the inner ends of the cutters rest, means exerting a yielding pressure against the outward movement of the cutters, means to turn the cam-bar to carry the cutters outward and support them under tension, means to lock the bar in any position to which it may be turned, and automatically-operated means to release the bar to permit the cutters to move inward, substantially as described.

5. The combination of the stock, radial cutters, central cam-bar against which the inner ends of the cutters abut, a collar connected with the cam-bar and turning on the stock, a spring for turning the collar in one direction, a locking-plate sliding on the stock and provided with a projection for engaging the collar, and a spring carrying the said plate toward the collar, substantially as set forth.

6. The combination of the stock, radially-movable cutters supported in the stock, a central cam-bar against which the inner ends of the cutters rest, means exerting a yielding pressure against the outward movement of the cutters, a collar connected with the cam-bar and turning on the stock, a spring for turning the collar on the stock in one direction, a locking-plate sliding on the stock, an adjustable locking device on the plate to engage the collar and lock the bar in any desired position to which it may be turned, and means for mechanically releasing the locking device to permit the cutters to move inwardly, substantially as set forth.

7. The combination of the tubular stock, radially-movable cams supported in the stock, a cam-bar within the stock against which the inner ends of the cutters rest, a collar mounted on the stock to turn thereon, a pin connecting the collar and cam-bar and working in a circumferentially-extending slot in the stock, a plate slidably mounted on the stock and carrying a locking device to engage the collar, a pin connected to the plate and projecting into the interior of the stock through a longitudinally-disposed slot therein, and a spring supported within the stock and exerting pressure on the pin to move the plate toward the collar, substantially as described.

8. The combination in a tap, of a tubular stock radially-movable cutters supported in the stock, a cap-piece secured to the end of the stock, and springs carried by the cap-piece and extending within the stock to bear on the cutters, substantially as described.

In testimony whereof I have signed my name to this specification in the presence of two subscribing witnesses.

WILLIAM JOHN SMITH.

Witnesses:
CHARLES E. FOSTER,
PAUL W. STEVENS.